Sept. 30, 1930.   P. A. PARADIS ET AL   1,776,979
TRAILER COUPLING DEVICE
Filed April 25, 1927    2 Sheets-Sheet 2
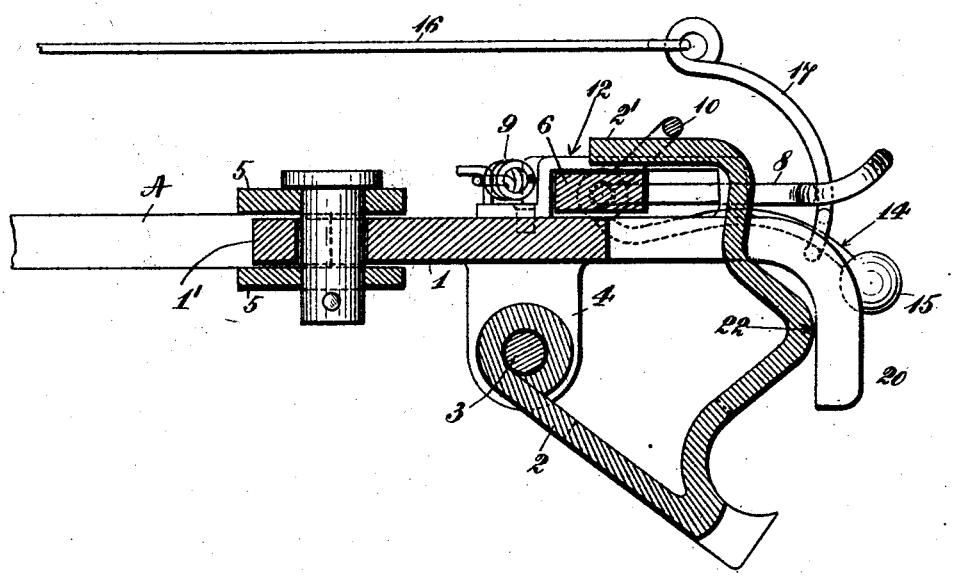
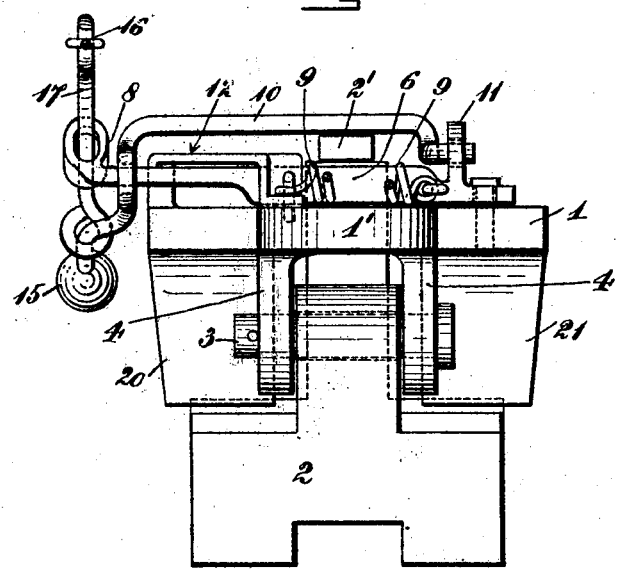

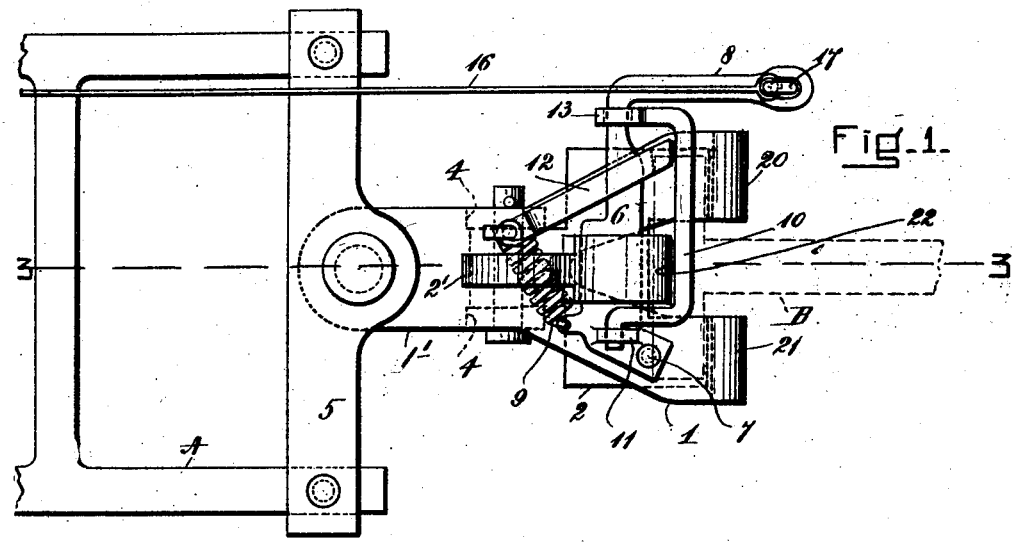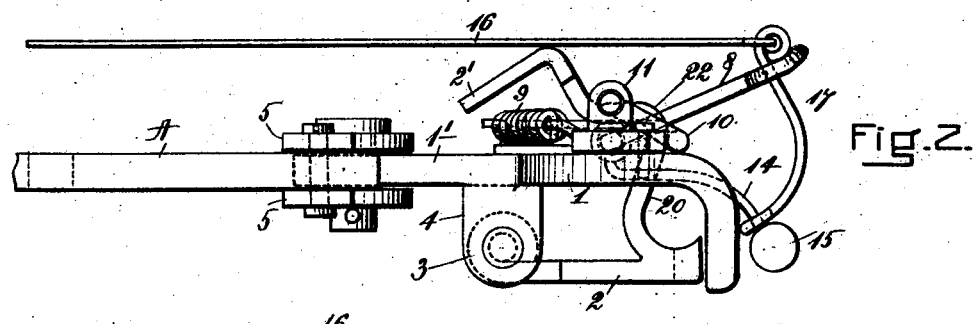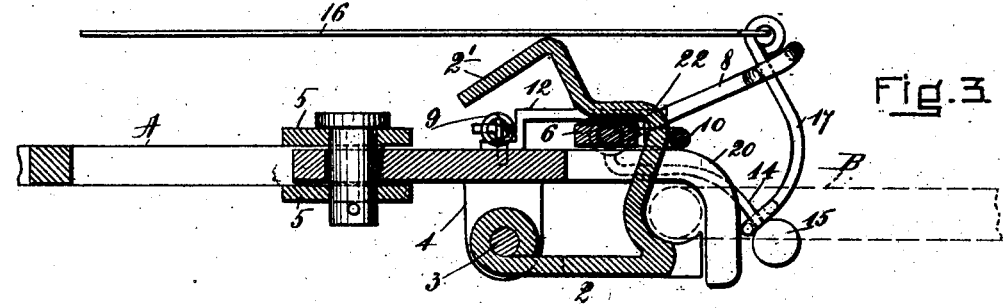

Patented Sept. 30, 1930

1,776,979

UNITED STATES PATENT OFFICE

PHILIPPE A. PARADIS, OF NORTH ANDOVER, AND JEAN BAPTISTE MASSE, OF LAWRENCE, MASSACHUSETTS

TRAILER-COUPLING DEVICE

Application filed April 25, 1927. Serial No. 186,497.

Fig. 1 is a plan view of our improved trailer coupling in locked position.

Fig. 2 is a side view of same.

Fig. 3 is a section on line 3—3 of Fig. 1.

Fig. 4 is a similar section showing the coupling in unlocked position.

Fig. 5 is an end view of the device.

The improved coupling is composed of upper and lower sections 1 and 2. These sections are hinged together at 3 by bars 4—4 extending downward from upper section 1.

The upper section 1 has an extension 1' which is loosely pivoted between bars 5—5. These bars are fastened rigidly to the rear end of an auto chassis A. The front or gripping part of section 1 is divided, leaving an opening in the center to allow steering pole to pass through. The two gripping parts are numbered 20—21. These parts, 1 and 2 of coupling, are so formed that they encircle the crosshead of steering pole B shown in dotted lines in the drawings. The lower section 2 of coupling extends upward between the opening in upper section 1. The extension of lower section 2 is so shaped that when released the part 2' rests on crossbar 6 as shown in Fig. 4 in the drawing. This crossbar 6 is loosely pivoted at one end as at 7 to the upper section 1. The other end of bar 6 has an extended arm 8. On this bar and attached thereto is a tension spring 9, which keeps the bar up against the inner side of part 22 of lower section 2 of coupling. When in this position, the coupling is locked.

The locking device 10 is pivoted at one end through an ear 11 on bar 6. The other end terminates in an eye 13 that loosely encircles the extension 8 of locking bar 6. 12 is a guard to hold down said bar, but allowing it to move backward or forward. On the underside of the eye part 13 of locking device 10 is attached an arm 14 and at the other end of same is a weight 15. This arm and weight hold the locking bar down on top of upper section of coupling and in front of part 22 of the lower section 2 and is so locked in position. Encircling arm 14 and extending up through an opening in extension arm 8 is a rod 17. The upper end of this rod passes through the opening in extension arm 8 of bar 6 and then is curved to make a circular opening. To this circular opening is attached a long rod 16.

By pulling on rod 16, the weighted arm 15 is raised up and lifts the locking device 10. This operation moves bar 6, which releases lower section of coupling and allows the trailer pole to drop. To close and lock coupling, the crosshead of the trailer pole is forced against part 20 of lower section 2 of coupling. This operation forces element 2 upward at the same time forcing locking bar backward against the tension of spring 9 until the top flat portion of part 2 is clear of the bar 10, which is then pulled forward automatically by the force of spring 9 to lock the element 2, while at the same time additional locking device 10 falls automatically by gravity behind the part 2 to additionally lock the same.

Having thus fully described our invention which we claim as new and desire to secure by Letters Patent is:—

1. A trailer coupler comprising a pair of cooperating trailer tongue clamping members, one of said members being pivoted at one end for movement into and out of clamping position, a spring retracted lock bar and a gravity actuated locking member engaging opposite sides of said pivoted clamping member for securing the latter against releasing movement, said lock bar and said locking member being movable in planes at substantially right angles to each other and means connecting said lock bar and said locking member for simultaneous releasing movement.

2. A trailer coupler comprising a pair of cooperating trailer tongue clamping members, one of said members being pivoted for horizontal movement and the other of said member being pivoted to said first named member for vertical movement into and out of clamping position, a lock bar pivoted to said horizontal moving clamping member, spring means urging said lock bar into position for engaging one side of said vertically movable clamping member, a locking member pivoted to the lock bar, gravity actuated means engaging said locking member into position for engaging the opposite sides of said vertically moving clamping member, said bar and said locking member cooperating to secure said vertically movable clamping member against releasing movement and means connecting said lock bar and said locking member for simultaneous releasing movement.

3. A trailer coupler comprising a pair of cooperating trailer tongue clamping members, including an upper clamping member and a lower clamping member pivoted thereto for vertical movement into and out of clamping position, said upper clamping member being pivoted for bodily horizontal movement, said lower clamping member being gravity actuated and having its free end extended upwardly and over said upper member, a lock bar pivoted for horizontal movement to the upper side of said upper clamping member, spring means urging said bar into engagement with one side of the free end of said lower clamping member, a locking member pivoted to said lock bar, gravity means urging the locking member into engagement with the opposite side of the free ends of the lower clamping member, said bar and said locking member cooperating to secure said lower clamping member against releasing movement, and means connecting said lock bar and said locking member for simultaneous releasing movement.

4. A trailer coupler comprising a pair of cooperating trailer tongue clamping members, including an upper clamping member and a lower clamping member pivoted thereto for vertical movement into and out of clamping position, said upper clamping member being pivoted for bodily horizontal movement, said lower clamping member being gravity actuated and having its free end extended upwardly and over said upper member, a lock bar pivoted for horizontal movement to the upper side of said upper clamping member, spring means urging said bar into engagement with one side of the free end of said lower clamping member, a locking member pivoted to said lock bar, gravity means urging the locking member into engagement with the opposite side of the free ends of the lower clamping member, said bar and said locking member cooperating to secure said lower clamping member against releasing movement, and means connecting said lock bar and said locking member for simultaneous releasing movement, said lock bar having an angular extension, a link having one end attached to the gravity means of the locking member and with its opposite end slidably inserted through said extension and a release rod attached to said last named end of the link for simultaneously releasing the lock bar and the locking member.

In witness whereof we hereunto subscribe our names this ninth day of April 1927.

PHILIPPE A. PARADIS.
JEAN BAPTISTE MASSE.